United States Patent
Bergquist et al.

(10) Patent No.: US 11,136,029 B2
(45) Date of Patent: Oct. 5, 2021

(54) METHOD FOR CONTROLLING A VEHICLE

(71) Applicant: VOLVO TRUCK CORPORATION, Gothenburg (SE)

(72) Inventors: Stefan Bergquist, Gothenburg (SE); Wilhelm Wiberg, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 302 days.

(21) Appl. No.: 16/345,780

(22) PCT Filed: Nov. 9, 2016

(86) PCT No.: PCT/EP2016/077131
§ 371 (c)(1),
(2) Date: Apr. 29, 2019

(87) PCT Pub. No.: WO2018/086682
PCT Pub. Date: May 17, 2018

(65) Prior Publication Data
US 2019/0263404 A1    Aug. 29, 2019

(51) Int. Cl.
*B60W 30/16*    (2020.01)
*B60W 30/08*    (2012.01)
(Continued)

(52) U.S. Cl.
CPC .......... *B60W 30/162* (2013.01); *B60W 30/08* (2013.01); *B60W 30/16* (2013.01);
(Continued)

(58) Field of Classification Search
CPC ......... B60W 2420/42; B60W 2420/52; B60W 2554/801; B60W 2556/65;
(Continued)

(56) References Cited

U.S. PATENT DOCUMENTS 5,901,806 A * 5/1999 Takahashi ................. B60T 7/22
180/170
7,274,988 B2 * 9/2007 Mukaiyama ....... B60K 31/0008
701/301
(Continued)

FOREIGN PATENT DOCUMENTS

| DE | 102014202453 A1 | 8/2015 |
| EP | 2738751 A1 | 6/2014 |
| WO | 2013187834 A1 | 12/2013 |

OTHER PUBLICATIONS

International Preliminary Report on Patentability dated Jan. 30, 2019 in International Application No. PCT/EP2016/077131.
(Continued)

*Primary Examiner* — Babar Sarwar
(74) *Attorney, Agent, or Firm* — Venable LLP; Jeffri A. Kaminski (57) ABSTRACT

The invention relates to a method for controlling a subject vehicle (1) travelling along a road behind a vehicle transmitting wireless signals representative of at least one parameter affecting the velocity and/or acceleration of the transmitting vehicle (2), the method comprising—receiving said wireless signals from the transmitting vehicle (2), —controlling (S6) the velocity and/or acceleration of the subject vehicle (1) in dependence on the received signals, —during said control (S6) in dependence on the received signals, monitoring (S3) by means (111) other than means for wireless communication a distance (DSF) between the subject vehicle (1) and a further vehicle (3) travelling between the subject vehicle (1) and the transmitting vehicle (2), —and determining in dependence on the monitoring of the distance (DSF) between the subject vehicle (1) and the further vehicle (3) whether or not to control (S5) the velocity and/or acceleration of the subject vehicle (1) in dependence on the monitored distance (DSF).

21 Claims, 4 Drawing Sheets

(51) Int. Cl.
*G01S 13/931* (2020.01)
*G08G 1/16* (2006.01)
*G08G 1/00* (2006.01)
*G05D 1/02* (2020.01)
*G01S 7/00* (2006.01)

(52) U.S. Cl.
CPC ............ G01S 7/003 (2013.01); G01S 13/931 (2013.01); G05D 1/0293 (2013.01); G08G 1/163 (2013.01); G08G 1/166 (2013.01); G08G 1/22 (2013.01); *B60W 2420/42* (2013.01); *B60W 2420/52* (2013.01); *B60W 2554/801* (2020.02); *B60W 2556/65* (2020.02); *B60W 2720/106* (2013.01); *G01S 2013/9316* (2020.01); *G01S 2013/9319* (2020.01); *G01S 2013/9323* (2020.01); *G01S 2013/9325* (2013.01); *G01S 2013/93185* (2020.01); *G01S 2013/93271* (2020.01); *G05D 2201/0213* (2013.01)

(58) Field of Classification Search
CPC ........... B60W 2720/106; B60W 30/08; B60W 30/16; B60W 30/162; G01S 13/931; G01S 2013/9316; G01S 2013/93185; G01S 2013/9319; G01S 2013/9323; G01S 2013/9325; G01S 2013/93271; G01S 7/003; G05D 1/0293; G05D 2201/0213; G08G 1/163; G08G 1/166; G08G 1/22
See application file for complete search history.

(56) References Cited

U.S. PATENT DOCUMENTS

| | | | | |
|---|---|---|---|---|
| 9,002,631 B2 * | 4/2015 | Taguchi | .................. | G01S 13/87 701/301 |
| 9,836,964 B2 * | 12/2017 | Nemoto | .................. | G08G 1/22 |
| 2002/0121398 A1 * | 9/2002 | Kikuchi | .................. | G08G 1/166 180/169 |
| 2006/0155469 A1 * | 7/2006 | Kawasaki | ............ | G01S 13/931 701/301 |
| 2006/0284760 A1 * | 12/2006 | Natsume | ............... | B60W 40/04 342/70 |
| 2010/0256835 A1 * | 10/2010 | Mudalige | ................. | G08G 1/164 701/2 |
| 2011/0301779 A1 * | 12/2011 | Shida | ..................... | G08G 1/161 701/1 |
| 2012/0191318 A1 * | 7/2012 | Holzmann | .......... | B60W 30/165 701/96 |
| 2013/0041576 A1 | 2/2013 | Switkes et al. | | |
| 2013/0116909 A1 * | 5/2013 | Shida | ..................... | B60K 31/00 701/96 |
| 2013/0297196 A1 * | 11/2013 | Shida | .................. | B60W 30/143 701/119 |
| 2014/0292545 A1 * | 10/2014 | Nemoto | ................. | G08G 1/017 340/988 |
| 2015/0360721 A1 * | 12/2015 | Matsuno | ......... | B60W 30/18163 701/41 |
| 2016/0343247 A1 * | 11/2016 | Strassberger | .......... | G08G 1/017 |
| 2017/0106861 A1 * | 4/2017 | Oh | ....................... | B60W 30/143 |
| 2017/0369062 A1 * | 12/2017 | Saigusa | ................. | B60W 30/16 |
| 2017/0369067 A1 * | 12/2017 | Saigusa | ........... | B60W 30/18163 |
| 2018/0093666 A1 * | 4/2018 | Kim | ...................... | B60W 30/16 |

OTHER PUBLICATIONS

International Search Report dated Jul. 7, 2017 in International Application No. PCT/EP2016/077131.
Steinbuch et all, "Sting-stable CACC design and experimental validation," TU/e Master's Thesis, R.P.A. Vugts, 2009.131.

* cited by examiner

METHOD FOR CONTROLLING A VEHICLE

TECHNICAL FIELD

The invention relates to a method for controlling a subject vehicle travelling along a road behind a vehicle transmitting wireless signals representative of at least one parameter affecting the velocity and/or acceleration of the transmitting vehicle.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

In Cooperative Adaptive Cruise Control (CACC) and platooning, vehicle convoys are driven with short distances between the vehicles. To achieve this with a high safety, a control unit of each vehicle receives information from surrounding vehicles over a wireless communication channel, so called Vehicle-to-Vehicle (V2V) communication. This information is used in the control to keep the desired distance between each vehicle and the immediately preceding vehicle and to handle events such as hard braking. The V2V communication enables keeping short distances safely since the V2V information is transferred much faster and is more accurate than data from on-board sensors such as radar sensors, laser sensors or cameras.

Benefits with CACC and platooning include increased fuel efficiency, provided by a reduced air-drag due to short distances between vehicles, and provided by improved vehicle control due to more accurate information about the preceding vehicle.

A further benefit is an improved traffic flow due to the small delay of the V2V data. For example, the traffic flow may be improved by reducing or eliminating the so called rubber-band effect between vehicles. Such an effect may appear due to the delay of a detection by a vehicle of a deceleration of a preceding vehicle, causing a stronger deceleration of the detecting vehicle, upon which a delay of a detection by a following vehicle of the stronger deceleration causing an even stronger deceleration of the following vehicle, and so on. In CACC based control the rubber band effect will be considerably reduced due to the decreased delay, and due to a detecting vehicle being able to take into account signals from vehicles in front of the immediately preceding vehicle.

Yet another benefit with CACC and platooning is an improved driver comfort since CACC allows less aggressive vehicle control compared to systems using on-board sensors exclusively.

A problem occurs if a vehicle which is not equipped for CACC based control enters or cuts in between two platooning vehicles. This problem is discussed e.g. in "String-stable CACC design and experimental validation", R. P. A. Vugts 2009.131 TU/e Master's Thesis April 2008-Januari 2010 TNO Science & Industry, Business Unit Automotive, Department of Integrated Safety, Technische Universiteit Eindhoven, Department of Mechanical Engineering. This publication suggests that communicated information beyond non-CACC-equipped vehicles is be discarded, leaving standard CC (Cruise Control) or ACC (Adaptive Cruise Control) functionality. CC or ACC do not present the benefits of CACC mentioned above. Thus, if such a cut in of a non-equipped vehicle occurs, the following vehicle needs to change the basis of the vehicle control from CACC to signals from on-board sensors. Thereby, all benefits mentioned above will instantly disappear.

EP2738751 discloses a host vehicle being in a tracking mode, in which the control of the host vehicle involves communication with another vehicle. If it is determined that a vehicle, captured by a sensor, is different from the vehicle that actually communicates with the host vehicle, the tracking is terminated.

US2010256835 discloses controlling the speed of a vehicle based upon control messages received through a communications device within the vehicle. US2010256835 also discloses an envelope defining minimum desirable ranges in four directions around a vehicle, and suggests monitoring objects, and object tracks, and changing the speed and course to avoid other objects entering the envelope.

DE102014202453 describes a method for detecting autonomously operated vehicles. If a vehicle has been detected as being operated autonomously, a distance threshold value is smaller than if the vehicle has been detected as being operated non-autonomously.

SUMMARY

An object of the invention is to expand the use of CACC based vehicle control and benefits thereof.

The object is reached by a method according to claim 1. Thus, the object is reached with a method for controlling a subject vehicle travelling along a road behind a vehicle transmitting wireless signals representative of the velocity and/or acceleration of the transmitting vehicle or at least one parameter affecting the velocity and/or acceleration of the transmitting vehicle, the method comprising receiving said wireless signals from the transmitting vehicle, controlling the velocity and/or acceleration of the subject vehicle in dependence on the received signals, during said control in dependence on the received signals, monitoring by means other than means for wireless communication a distance between the subject vehicle and a further vehicle travelling between the subject vehicle and the transmitting vehicle, and determining in dependence on the monitoring of the distance between the subject vehicle and the further vehicle whether or not to control the velocity and/or acceleration of the subject vehicle in dependence on the monitored distance.

The wireless signals are adapted for vehicle platooning and may be suited for a CACC based vehicle control algorithm. It is understood that the wireless signals from the transmitting vehicle are received by the subject vehicle while the subject vehicle and the transmitting vehicle are travelling.

The wireless signals may represent the velocity and/or acceleration of the transmitting vehicle. Alternatively, the wireless signals may be representative of at least one parameter affecting the velocity and/or acceleration, such as a brake actuation status of the transmitting vehicle, or a requested torque of a propulsion power source, such as an internal combustion engine, of the transmitting vehicle. The wireless signals being representative of a parameter affecting the velocity and/or acceleration of the transmitting vehicle may involve the wireless signals representing values of a parameter which is correlated with values of the velocity and/or the acceleration. Such a correlation may be provided by data mapping values of the parameter to values of the velocity and/or the acceleration, which data may be stored in a digital memory of a vehicle control system of the subject vehicle.

Besides velocity and/or acceleration, the wireless signals may represent other parameters which may be useful in platooning, such as the dimensions of the transmitting vehicle.

It should be noted that controlling the velocity and/or acceleration of the subject vehicle in dependence on the received signals may in some embodiments involve controlling the subject vehicle velocity. For example, a control unit of the subject vehicle may request adjustments of a drivetrain of the vehicle with the vehicle velocity as a feedback parameter. Thereby, the subject vehicle acceleration may of course be adjusted as well. Correspondingly, in some embodiments controlling the velocity and/or acceleration in dependence on the received signals may involve controlling the subject vehicle acceleration. For example, a control unit of the subject vehicle may request adjustments of a drivetrain of the vehicle with the vehicle acceleration as a feedback parameter. Thereby, the subject vehicle velocity may of course be adjusted as well. In further embodiments, the control may be made with the velocity and the acceleration as feedback parameters.

Monitoring the distance to the further vehicle may involve detecting and registering the distance. This may be done by means of any suitable equipment. Thus, the means other than means for wireless communication, herein also referred to as means for monitoring the distance to the further vehicle, may comprise one or more onboard sensor which may be a radar sensor, a laser sensor and/or a camera. The distance to the further vehicle may be used to determine the velocity and/or acceleration of the further vehicle, and vice versa.

The invention allows the subject vehicle to adapt the driving strategy so that the distance to the further vehicle is increased if needed to let the further vehicle safely travel between the subject vehicle and the transmitting vehicle, while keeping active the control in dependence on the received signals. Thus, as long as the distance to the further vehicle is kept above a safe value the control of the subject vehicle may be dominated by a CACC strategy.

By the invention it is possible to retain benefits of CACC control even if a vehicle without CACC equipment cuts in between two vehicles in vehicle platooning. Thus, invention expands the working range of CACC. For example it is possible to retain the benefit of increased fuel efficiency provided by improved vehicle control due to more accurate information about the vehicle preceding. Further, it is possible to retain the benefit of improved traffic flow e.g. by reducing the rubber-band effect discussed above. It is also possible to retain the benefit of the improved driver comfort mentioned above.

It should be noted that the invention is also applicable to situations where two or more vehicles without CACC equipment travel between the subject vehicle and the transmitting vehicle.

Preferably, controlling the velocity and/or acceleration of the subject vehicle in dependence on the monitored distance comprises overriding said control in dependence on the received signals. Thereby, it is secured that safety is maintained in relation to the further vehicle during the CACC based control in relation to the transmitting vehicle.

Preferably, the monitoring of the distance between the subject vehicle and the further vehicle comprises continuously or repeatedly determining the distance between the subject vehicle and the further vehicle, and comparing the determined distance to a threshold distance value. Thereby, determining whether or not to control the velocity and/or acceleration of the subject vehicle in dependence on the monitored distance preferably comprises, if the determined distance is above the threshold distance value, the determined distance does not influence the control of the velocity and/or acceleration of the subject vehicle, and, if the determined distance is below the threshold distance value, the velocity and/or acceleration of the subject vehicle is controlled in dependence on the monitored distance.

It is understood that the threshold distance value preferably is dependent on the velocity of the subject vehicle. The threshold distance value is preferably adjusted in dependence on the velocity of the subject vehicle.

Thus, the method may comprise comparing the determined distance between the subject vehicle and the further vehicle to the threshold distance value. If the determined distance between the subject vehicle and the further vehicle is above the threshold distance value, the determined distance between the subject vehicle and the further vehicle does not influence the control of the velocity and/or acceleration of the subject vehicle. Hence, the distance between the subject vehicle and the further vehicle is merely monitored. Thus, as long as the distance to the further vehicle is kept above the threshold distance value the control of the subject vehicle may be dominated by a CACC strategy.

If the determined distance between the subject vehicle and the further vehicle is below the threshold distance value, the velocity and/or acceleration of the subject vehicle is controlled in dependence on the determined distance between the subject vehicle and the further vehicle. Preferably the means, other than the means for wireless communication, is used to control the vehicle only if the distance to the further vehicle falls below the threshold value.

The monitoring of the distance between the subject vehicle and the further vehicle comprising such comparing of the determined distance to the threshold distance value allows an advantageous retaining of a dominant CACC control of the subject vehicle while safely monitoring the further vehicle in a manner that is reliable and simple to implement.

Preferably the method comprises continuously or repeatedly, during said control in dependence on the monitored distance, determining by the means other than means for wireless communication the distance between the subject vehicle and the further vehicle, and comparing the determined distance to the threshold distance value. Thereby, if the determined distance is above the threshold distance value, the velocity and/or acceleration of the subject vehicle may be controlled in dependence on the received signals. This provides continuous safety in relation to the further vehicle in during the CACC based control in relation to the transmitting vehicle.

Preferably, controlling the velocity and/or acceleration of the subject vehicle in dependence on the monitored distance comprises controlling the subject vehicle so as to increase the distance between the subject vehicle and the further vehicle. Thereby, it is further secured that safety is maintained in relation to the further vehicle during the CACC based control in relation to the transmitting vehicle.

Preferably the method comprises establishing, before monitoring the distance between the subject vehicle and the further vehicle, the presence of the further vehicle between the subject vehicle and the transmitting vehicle. Before establishing the presence of the further vehicle, the velocity and/or acceleration of the subject vehicle may be controlled in dependence on the received signals from the transmitting vehicle. Further, before establishing the presence of the further vehicle, it may be established that there is no vehicle between the transmitting vehicle and the subject vehicle. Preferably, said control of the subject vehicle in dependence on the received signals comprises, before establishing the presence of the further vehicle, controlling the subject vehicle so as to be at a first distance from the transmitting vehicle. Thereby, the control of the subject vehicle in dependence on the received signals may comprise, after establishing the presence of the further vehicle, controlling the subject vehicle so as to be at a second distance from the transmitting vehicle which is larger than the first distance. Thereby, situations allowing a closer distance to the transmitting vehicle may be clearly identified, whereby the distance between the subject vehicle and the further vehicle can be advantageously low allowing the above mentioned drag reduction.

Preferably, the method comprises determining, upon establishing the presence of the further vehicle, by the means other than means for wireless communication, the distance between the subject vehicle and the further vehicle. If the determined distance is below the threshold distance value, the velocity and/or acceleration of the subject vehicle may be controlled so as to increase the distance between the subject vehicle and the further vehicle. Thereby, a temporary interruption on the control based on the signals from the transmitting vehicle may be effected, and an immediate adjustment of the position of the subject vehicle in relation to the arriving further vehicle may be provided.

It is understood that in some applications of the method, the further vehicle may enter between subject vehicle and the transmitting vehicle during platooning. However, the invention is also applicable to the further vehicle being present between the subject vehicle and the transmitting vehicle before said step of controlling the velocity and/or acceleration of the subject vehicle in dependence on the received signals. As an example, the subject vehicle may catch up with the transmitting vehicle having the further vehicle behind it. Thus, the method according to embodiments of the invention may be flexibly applied to a plurality of driving situations of the subject vehicle.

In advantageous embodiments, the monitoring of the distance between the subject vehicle and the further vehicle comprises continuously or repeatedly determining a velocity of the further vehicle in relation to the subject vehicle. Thereby, the method may comprise comparing the determined further vehicle velocity to a threshold velocity value, wherein determining whether or not to control the velocity and/or acceleration of the subject vehicle in dependence on the monitored distance comprises, if the determined velocity of the further vehicle in relation to the subject vehicle is below the threshold velocity value, the velocity and/or acceleration of the subject vehicle is controlled in dependence on the monitored distance.

The threshold velocity value is preferably negative. I.e. if the threshold velocity value is reached, the further vehicle is travelling with a lower absolute velocity than the subject vehicle. Thus, the control of the subject vehicle velocity and/or acceleration in dependence on the monitored distance may be effected if the determined velocity of the further vehicle in relation to the subject vehicle has a larger negative value than the threshold velocity value.

In some embodiments, the monitoring of the distance between the subject vehicle and the further vehicle comprises continuously or repeatedly determining an acceleration of the further vehicle in relation to the subject vehicle. Thereby, the method may comprise comparing the determined further vehicle acceleration to a threshold acceleration value, wherein determining whether or not to control the velocity and/or acceleration of the subject vehicle in dependence on the monitored distance comprises, if the determined acceleration of the further vehicle in relation to the subject vehicle is below the threshold acceleration value, the velocity and/or acceleration of the subject vehicle is controlled in dependence on the monitored distance.

The threshold acceleration value is preferably negative. I.e. if the threshold acceleration value is reached, the further vehicle presents a lower acceleration than the subject vehicle. For example, the subject vehicle may travel at a constant speed and the further vehicle may be decelerating. Thus, the control of the subject vehicle velocity and/or acceleration in dependence on the monitored distance may be effected if the determined acceleration of the further vehicle in relation to the subject vehicle has a larger negative value than the threshold velocity value.

By the activation of the control of the subject vehicle velocity and/or acceleration in dependence on the monitored distance being dependent on the velocity or the acceleration of the further vehicle in relation to the subject vehicle, a further safety feature may be added to the method. Alternatively, the threshold distance value discussed above may be reduced. Monitoring the velocity or the acceleration of the further vehicle in relation to the subject vehicle provides for an early reaction to an impending short distance between the subject vehicle and the further vehicle, and thereby, measures to address this impending situation can be taken at an early stage. This provides an increased safety in relation to the further vehicle. Alternatively or in addition, such an early reaction may allow decreasing the distance between the subject vehicle and the further vehicle when travelling under CACC control and simply monitoring the further vehicle.

It is understood that such monitoring of the velocity or acceleration of the further vehicle in relation to the subject vehicle may be done simultaneously with the monitoring of the distance between the subject vehicle and the further vehicle. However, in some embodiments, the distance between the subject vehicle and the further vehicle may be initially determined, and subsequently the velocity or an acceleration of the further vehicle in relation to the subject vehicle may be continuously or repeatedly determined. Thereby, changes of the distance between the subject vehicle and the further vehicle can be determined by integration of the velocity or acceleration of the further vehicle in relation to the subject vehicle.

Preferably, the method comprises establishing that the further vehicle is no longer present between the subject vehicle and the transmitting vehicle. Upon the establishment that the further vehicle is no longer present between the subject vehicle and the transmitting vehicle, the subject vehicle may be controlled in dependence on the received signals so as to decrease the distance between the subject vehicle and the transmitting vehicle.

Thereby, the distance between the subject vehicle and the further vehicle can be advantageously resumed to be short, allowing without delay the above mentioned drag reduction.

The object is also reached with a computer program according to claim 23, a computer readable medium according to claim 24, a control unit according to claim 25, or a vehicle according to claim 26.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
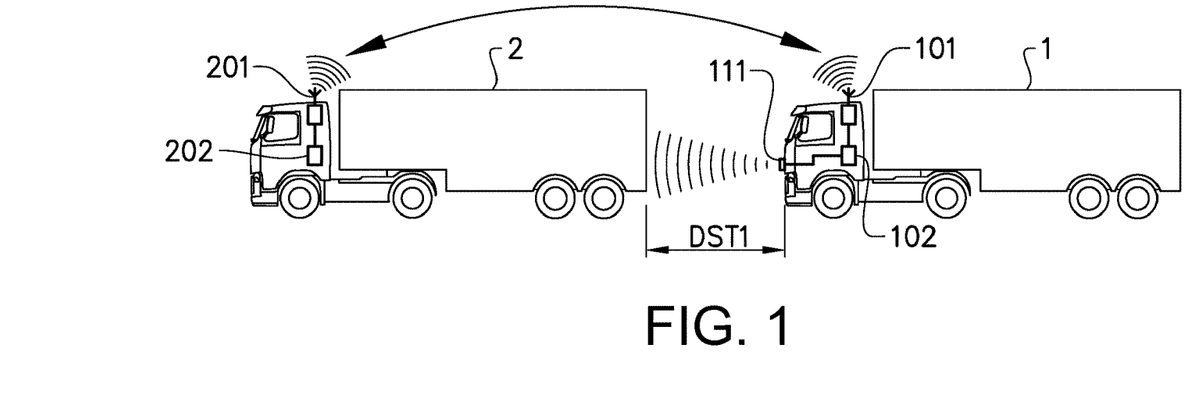
FIG. 1 is a side view of two vehicles during vehicle platooning.

FIG. 1 shows what is herein referred to as a subject vehicle 1 travelling along a road behind another vehicle, herein referred to as a transmitting vehicle 2. In this example, the subject vehicle 1 as well as the transmitting vehicle 2 are trucks with semitrailers. However, the invention is equally applicable to other types of vehicles, such as cars, buses and dump trucks.

Each of the subject vehicle 1 and the transmitting vehicle 2 comprises equipment 101, 201 for Cooperative Adaptive Cruise Control (CACC), including means for wireless communication with a radio transmitter and a radio receiver for so called Vehicle-to-Vehicle (V2V) communication, and a data communication processing device which is arranged to communicate with a control unit 102, 202 of a respective vehicle control system. Thereby, each of the vehicles 1, 2 is adapted to transmit signals representative of the dimensions, velocity and acceleration of the respective vehicle to other vehicles comprising equipment for CACC. Further, each of the vehicles 1, 2 is adapted to receive signals representative of the dimensions, velocity and acceleration of other vehicles comprising equipment for CACC, and to control the velocity and acceleration of the respective vehicle based on the received signals.

In the situation depicted in FIG. 1, the transmitting vehicle 2 transmits wireless signals representative of the dimensions, velocity and the acceleration of the transmitting vehicle 2. The subject vehicle 1 receives said wireless signals from the transmitting vehicle 2. Thereby, the vehicles 1, 2 are involved in a vehicle platooning process, in which the subject vehicle 1 is controlled to be at a relatively short distance, herein referred to as a first distance DST1, from the transmitting vehicle 2.

The vehicle control system of the subject vehicle 1 controls brakes and a drivetrain of the subject vehicle 1 based on the wireless signals received from the transmitting vehicle 2. For example, if the transmitting vehicle 2 brakes hard, signals representing the resulting deceleration will be received by the subject vehicle 1 which will based thereupon brake hard as well. CACC will in such a situation allow a considerably faster response by the subject vehicle 1, compared to a vehicle control based on radar, laser or camera detection of the deceleration of the vehicle in front of the subject vehicle 1.

In addition to the equipment for CACC, the subject vehicle comprises a radar sensor 111 by means of which the presence of, and the distance to, an object in front of the subject vehicle 1 may be determined. The radar sensor 111 provides means in addition to the CACC equipment for controlling the subject vehicle 1 in relation to other vehicles. In alternative embodiments, the means in addition to the CACC equipment for controlling the subject vehicle 1 in relation to other vehicles, could be provided by a laser sensor or a camera.

Figure 2:
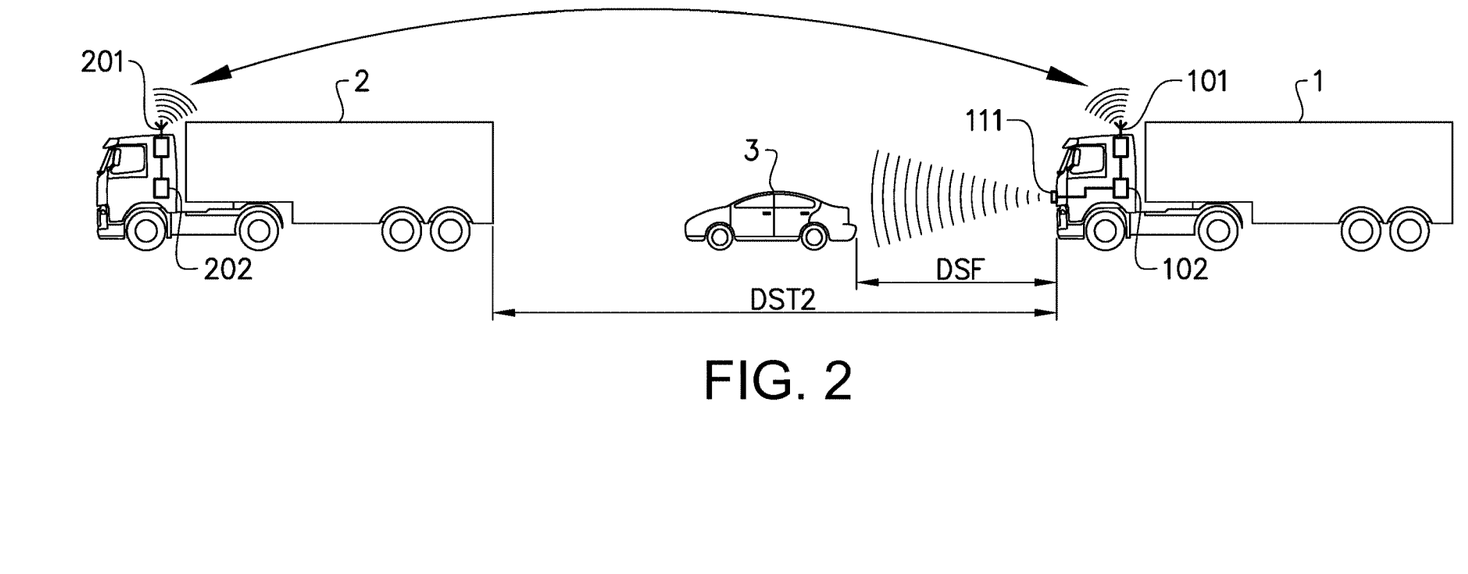
FIG. 2 is a side view of the vehicles in FIG. 1 with a further vehicle between them.

In FIG. 2, a further vehicle 3 has entered between the subject vehicle 1 and the transmitting vehicle 2. The further vehicle is in this example a car, but can of course be any other kind of vehicle, such as a truck or a bus. The further vehicle 3 does not have any equipment for CACC.

Figure 3:
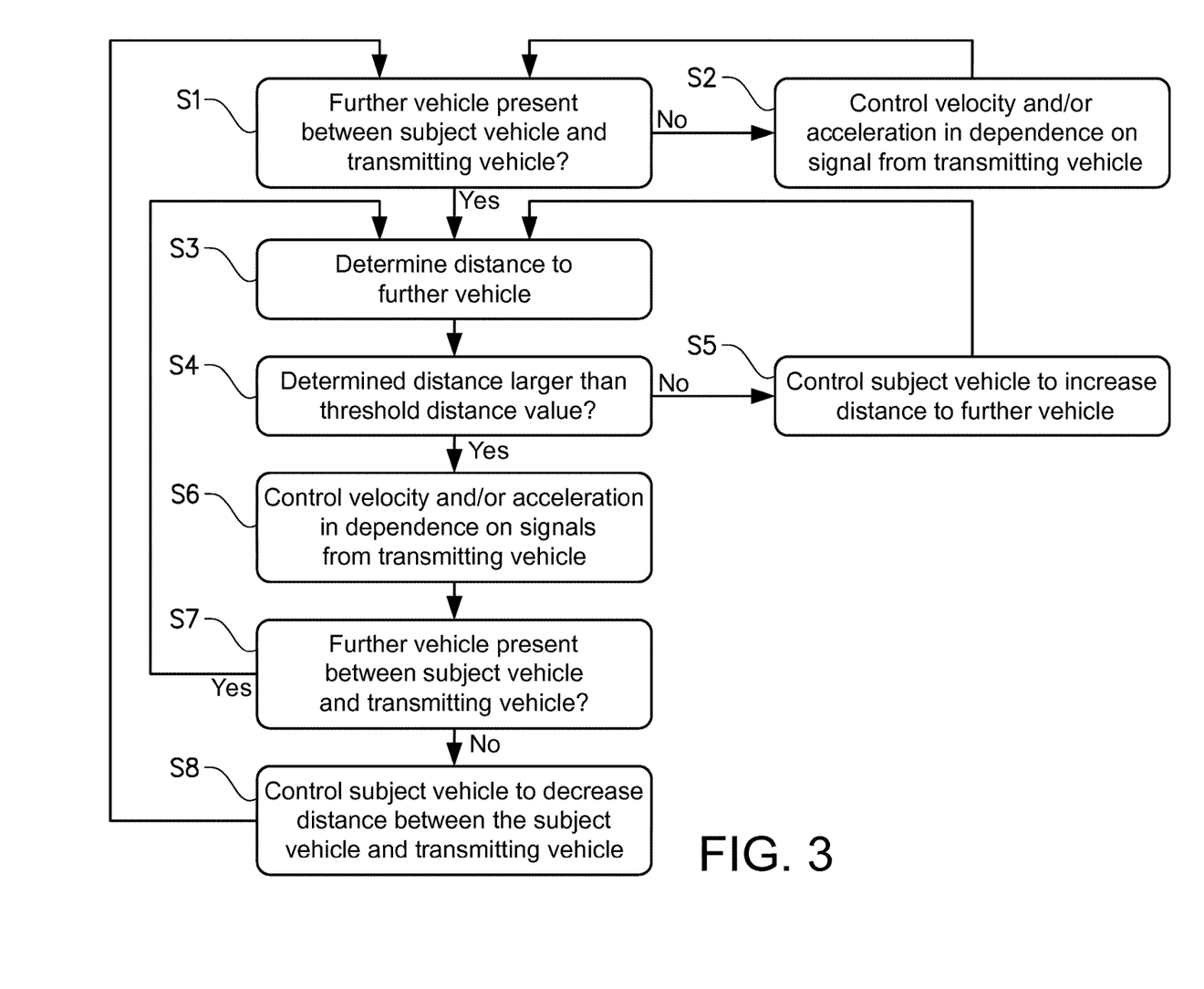
FIG. 3 is a block diagram depicting steps in a method according to an embodiment of the invention.

With reference also to FIG. 3, a method according to an embodiment of the invention will be described. The method carried out by the control unit 102 of the subject vehicle 1. It should be noted that the control unit could be embodied as one physical unit or as a plurality of physical units arranged to communicate with each other. The control unit 102 may comprise computing means such as a CPU or other processing device, and storing means such as a semiconductor storage section, e.g. a RAM or a ROM, or such a storage device as a hard disk or a flash memory.

The method is applied when the subject vehicle is travelling behind the transmitting vehicle 2. The method comprises establishing S1 whether there is a further vehicle 3 between the subject vehicle 1 and the transmitting vehicle 2. This is done by comparing distance data based on signals received from the radar sensor 111 with the first distance DST1 to the transmitting vehicle 2 as established by means of the CACC equipment 101. In some embodiments, establishing S1 whether or not there is a further vehicle 3 between the subject vehicle 1 and the transmitting vehicle 2 may involve the use of GPS (Global Positioning System) data sent from the transmitting vehicle 2 to the subject vehicle 1 by means of the CACC equipment 101, 201.

If there is no further vehicle 3 between the subject vehicle 1 and the transmitting vehicle 2, the velocity and acceleration of the subject vehicle 1 is controlled S2 in dependence on the received signals from the transmitting vehicle 2 so as for the subject vehicle to remain at the first distance DST1 from the transmitting vehicle 2, as shown in FIG. 1. In addition, repeatedly or continuously the control unit 102 establishes S1 whether there is a further vehicle 3 between the subject vehicle 1 and the transmitting vehicle 2.

If it is established S1 that there is a further vehicle 3 between the subject vehicle 1 and the transmitting vehicle 2, the distance DSF, as indicated in FIG. 2, between the subject vehicle 1 and the further vehicle 3 is determined S3 by means of the radar transmitted 111, and compared S4 to a threshold distance value. The threshold distance value is continuously adjusted in dependence on the velocity of the subject vehicle 1. If the determined distance DSF is below the threshold distance value, the subject vehicle is controlled S5 so as to increase the distance between the subject vehicle 1 and the further vehicle 3. This control S5 to increase the distance DSF between the subject vehicle 1 and the further vehicle 3 overrides said control S2 in dependence on the received signals from the transmitting vehicle 2.

The steps of determining S3 the distance DSF between the subject vehicle 1 and the further vehicle 3, comparing S4 the distance DSF to the threshold distance value, and controlling S5 the subject vehicle so as to increase the distance between the subject vehicle 1 and the further vehicle 3, are repeated until it is determined S4 that the distance DSF between the subject vehicle 1 and the further vehicle 3 is above the threshold distance value.

Upon determining S4 that the distance DSF between the subject vehicle 1 and the further vehicle 3 is above the threshold distance value, the control of the subject vehicle 1 in dependence on the signals received from the transmitting vehicle 2 is resumed S6. Thereby, the control unit 102 controls S6 the subject vehicle 1 so as to be at a second distance DST2, indicated in FIG. 2, from the transmitting vehicle 2 which is larger than the first distance DST1.

During said control S6 in dependence on the signals received from the transmitting vehicle 2, the control unit 102 continuously or repeatedly determines S7 whether the further vehicle 3 is still present between the subject vehicle 1 and the transmitting vehicle 2. This is done by comparing distance information based on signals from the radar sensor 111 to the second distance DST2 controlled by the signals received from the transmitting vehicle.

Further during said control S6 in dependence on the signals received from the transmitting vehicle 2, the control unit 102 continuously or repeatedly determines S3 by means of the radar sensor 111 the distance DSF between the subject vehicle 1 and the further vehicle 3, and compares S4 the determined distance DSF to the threshold distance value. As long as the determined distance DSF is above the threshold distance value, the control S6 in dependence on the signals received from the transmitting vehicle 2 is maintained.

It should be noted that during this control S6 in dependence on the signals received from the transmitting vehicle 2, the determined distance DSF between the subject vehicle 1 and the further vehicle 3 does not influence the control of the subject vehicle 1. Instead the distance DSF between the subject vehicle 1 and the further vehicle 3 is merely monitored.

However, if during said control S6 in dependence on the signals received from the transmitting vehicle 2, it is determined S3, S4 by means of the radar sensor 111 that the distance DSF between the subject vehicle 1 and the further vehicle 3 is shorter than the threshold distance value, said control S6 in dependence on the received signals is overridden and the subject vehicle 1 is controlled in dependence on the signals from the radar sensor 111 so as to increase the distance DSF between the subject vehicle 1 and the further vehicle 3. Upon determining S4 that the distance DSF between the subject vehicle 1 and the further vehicle 3 is above the threshold distance value, the control of the subject vehicle 1 in dependence on the signals received from the transmitting vehicle 2 is once again resumed S6.

If it is established S7 that the further vehicle 3 is no longer present between the subject vehicle 1 and the transmitting vehicle 2, the subject vehicle 1 is controlled S8 in dependence on the signals received from the transmitting vehicle 2, so as to decrease the distance DST2 between the subject vehicle 1 and the transmitting vehicle 2. Thereupon, the subject vehicle 1 is once again controlled S2 in dependence on the received signals from the transmitting vehicle 2 so as for the subject vehicle to remain at the first distance DST1 from the transmitting vehicle 2, as shown in FIG. 1, and as mentioned the control unit 102 determines repeatedly or continuously whether there is a further vehicle 3 between the subject vehicle 1 and the transmitting vehicle 2.

Figure 4:
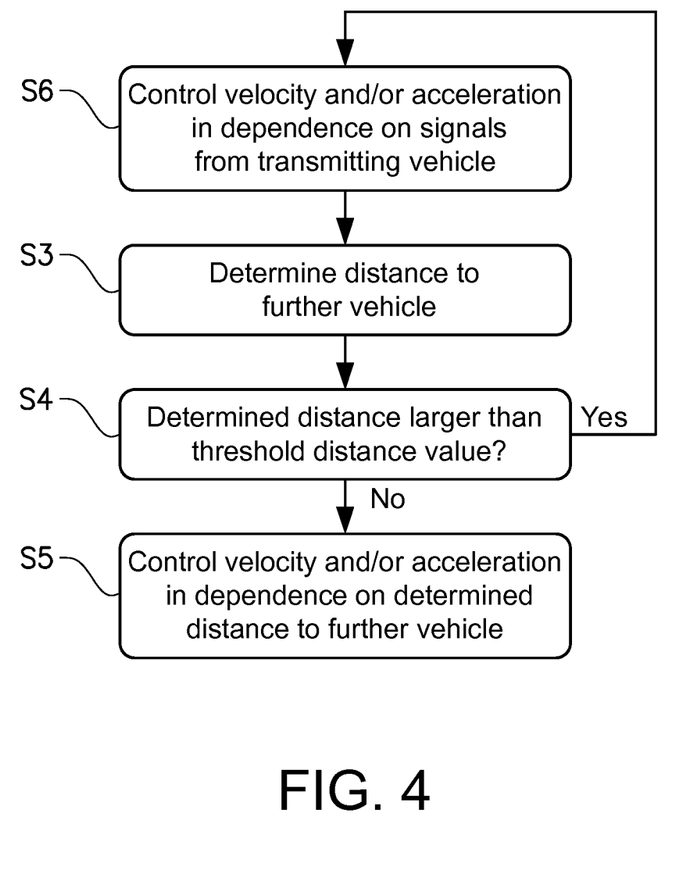
FIG. 4 is a block diagram depicting steps in a method according to a further embodiment of the invention.
Figure 5:
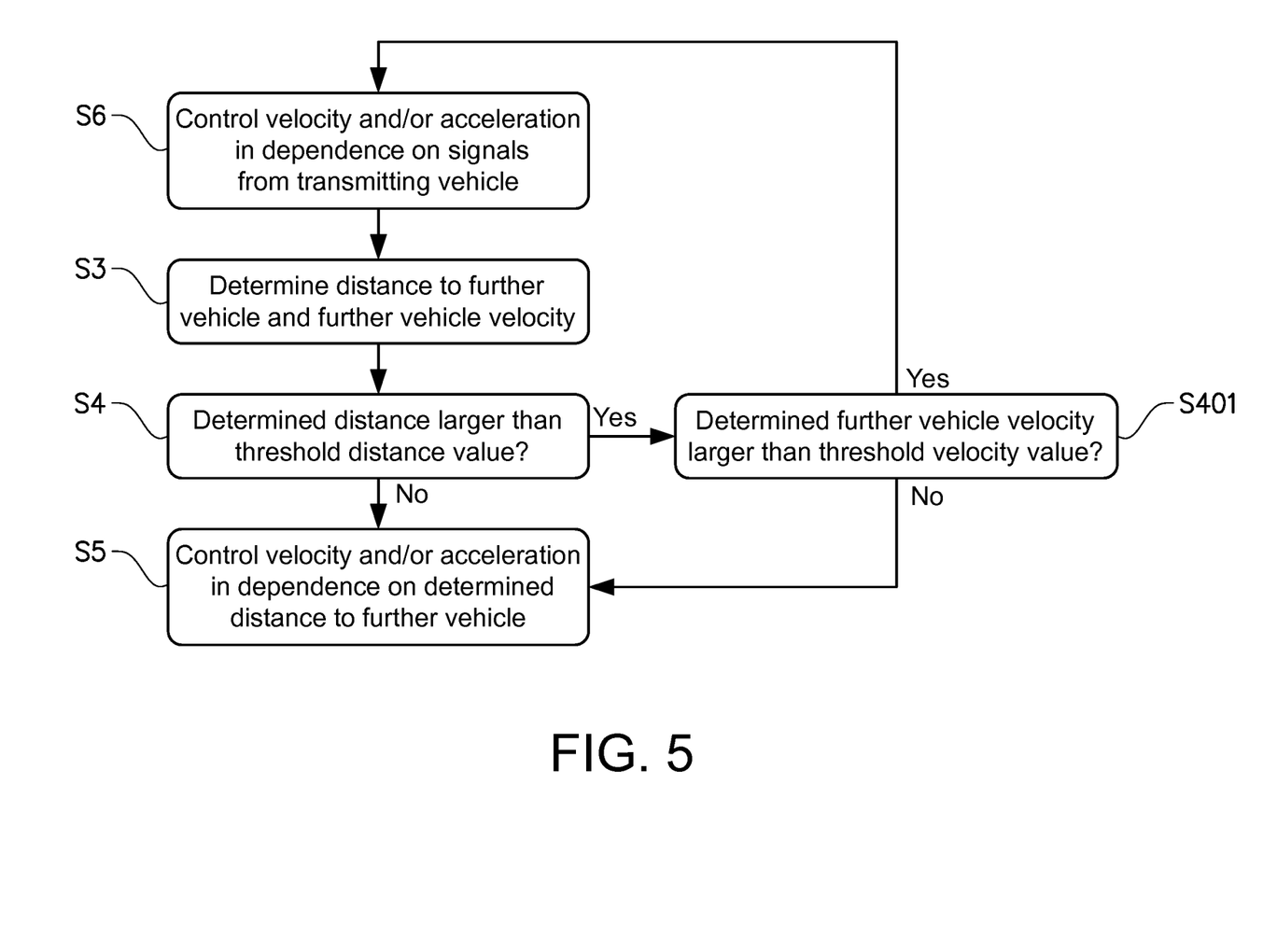
FIG. 5 is a block diagram depicting steps in a method according to another embodiment of the invention.

Reference is made to FIG. 4 showing steps in another, somewhat simplified embodiment of the method. The vehicles 1, 2, 3 involved in this example of the method are similar to the vehicles described above with reference to FIG. 1 and FIG. 2. Also in this example, a subject vehicle 3 travels along a road behind a transmitting vehicle 2. When a further vehicle 3 is present between the subject vehicle 1 and the transmitting vehicle 2, a control unit 102 of the subject vehicle controls S6 the subject vehicle 1 so as to be at a second distance DST2, indicated in FIG. 2, from the transmitting vehicle 2.

During this control S6 in dependence on the signals received from the transmitting vehicle 2, the control unit 102 continuously or repeatedly determines S3 by means of a radar sensor 111, or some other suitable distance determining means such as a laser sensor or a camera, the distance DSF between the subject vehicle 1 and the further vehicle 3. The determined distance DSF is compared S4 to a threshold distance value. The threshold distance value is adjusted in dependence on the velocity of the subject vehicle 1. As long as the determined distance DSF is above the threshold distance value, the control S6 in dependence on the signals received from the transmitting vehicle 2 is maintained.

Similarly to the embodiment described with reference to FIG. 3, during this control S6 in dependence on the signals received from the transmitting vehicle 2, the determined distance DSF between the subject vehicle 1 and the further vehicle 3 does not influence the control of the subject vehicle 1. Instead the distance DSF between the subject vehicle 1 and the further vehicle 3 is merely monitored.

However, if during said control S6 in dependence on the signals received from the transmitting vehicle 2, it is determined S3, S4 by means of the radar sensor 111 that the distance DSF between the subject vehicle 1 and the further vehicle 3 is below the threshold distance value, the subject vehicle is controlled S5 so as to increase the distance between the subject vehicle 1 and the further vehicle 3. This control S5 to increase the distance DSF between the subject vehicle 1 and the further vehicle 3 overrides said control S2 in dependence on the received signals from the transmitting vehicle 2.

Reference is made to FIG. 4 showing steps in a method similar to the method described with reference to FIG. 4, but with the following difference. In addition to determining S3 the distance DSF between the subject vehicle 1 and the further vehicle 3, the velocity of the further vehicle 3 in relation to the subject vehicle 1 is continuously or repeatedly determined S3. Similarly to the determination S3 of the distance DSF, the velocity determination S3 may be done by means of the radar sensor 111, or some other suitable distance determining means such as a laser sensor or a camera.

If it is determined S3, S4 that the distance DSF between the subject vehicle 1 and the further vehicle 3 is above the threshold distance value, it is determined S401 whether the velocity of the further vehicle in relation to the subject vehicle is larger than a threshold velocity value. The threshold velocity value is negative, i.e. when the velocity of the further vehicle in relation to the subject vehicle is at the threshold value, the distance between the vehicles is shortened.

If the velocity of the further vehicle 3 in relation to the subject vehicle 1 is larger than a threshold velocity value, e.g. by being zero or positive, the control S6 in dependence on the signals received from the transmitting vehicle 2 is maintained. However, if the velocity of the further vehicle in relation to the subject vehicle is smaller than a threshold velocity value, e.g. by presenting a larger negative number, the subject vehicle is controlled S5 so as to increase the distance between the subject vehicle 1 and the further vehicle 3.

In some embodiments, the acceleration of the further vehicle 3 in relation to the subject vehicle 1 may be taken into account in the monitoring of the further vehicle, in a manner similar to taking the velocity of the further vehicle 3 in relation to the subject vehicle 1 into account as described with reference to FIG. 4. Advantages with taking into consideration the velocity or acceleration of the further vehicle 3 in relation to the subject vehicle 1 in these manners, including possibilities of an earlier reaction of the subject vehicle to a shorting distance between the vehicles, have been discussed above.

The invention claimed is:

1. A method for controlling a subject vehicle (1) travelling along a road behind a vehicle transmitting wireless signals representative of a velocity and/or acceleration of the transmitting vehicle (2) or at least one parameter affecting the velocity and/or acceleration of the transmitting vehicle (2), the method comprising receiving said wireless signals from the transmitting vehicle (2), and controlling (S6) the velocity and/or acceleration of the subject vehicle (1) in dependence on the received wireless signals, characterized by during said control (S6) in dependence on the received wireless signals, monitoring (S3) by means (111) other than means for wireless communication a distance (DSF) between the subject vehicle (1) and a further vehicle (3) travelling between the subject vehicle (1) and the transmitting vehicle (2), wherein the monitoring of the distance (DSF) between the subject vehicle (1) and the further vehicle (3) comprises continuously or repeatedly determining the distance (DSF) between the subject vehicle (1) and the further vehicle (3), and comparing (S4) the determined distance (DSF) to a threshold distance value, and determining in dependence on the monitoring of the distance (DSF) between the subject vehicle (1) and the further vehicle (3) whether or not to control (S5) the velocity and/or acceleration of the subject vehicle (1) in dependence on the monitored distance (DSF), wherein, as long as the determined distance (DSF) is above the threshold distance value, the control (S6) in dependence on the wireless signals received from the transmitting vehicle (2) is maintained.

2. The method according to claim 1, characterized in that the means other than means for wireless communication comprises a radar sensor (111), a camera and/or a laser sensor of the subject vehicle (1).

3. The method according to claim 1, characterized in that controlling (S5) the velocity and/or acceleration of the subject vehicle (1) in dependence on the monitored distance (DSF) comprises overriding said control (S6) in dependence on the received wireless signals.

4. The method according to claim 1, characterized in that determining whether or not to control (S5) the velocity and/or acceleration of the subject vehicle (1) in dependence on the monitored distance (DSF) comprises, if the determined distance (DSF) is above the threshold distance value, the determined distance (DSF) does not influence (S6) the control of the velocity and/or acceleration of the subject vehicle (1), and, if the determined distance (DSF) is below the threshold distance value, the velocity and/or acceleration of the subject vehicle (1) is controlled (S5) in dependence on the monitored distance (DSF).

5. The method according to claim 1, characterized by continuously or repeatedly, during said control (S5) in dependence on the monitored distance (DSF), determining by the means (111) other than means for wireless communication the distance (DSF) between the subject vehicle (1) and the further vehicle (3), and comparing (S4) the determined distance (DSF) to the threshold distance value.

6. The method according to claim 5, characterized by controlling (S6), if the determined distance (DSF) is above the threshold distance value, the velocity and/or acceleration of the subject vehicle (1) in dependence on the received wireless signals.

7. The method according to claim 1, characterized in that controlling (S5) the velocity and/or acceleration of the subject vehicle (1) in dependence on the monitored distance (DSF) comprises controlling (S5) the subject vehicle (1) so as to increase the distance between the subject vehicle and the further vehicle (3).

8. The method according to claim 1, characterized by establishing (S1), before monitoring the distance (DSF) between the subject vehicle (1) and the further vehicle (3), a presence of the further vehicle (3) between the subject vehicle (1) and the transmitting vehicle (2).

9. The method according to claim 8, characterized by controlling (S2), before establishing (S1) the presence of the further vehicle (3), the velocity and/or acceleration of the subject vehicle (1) in dependence on the received wireless signals from the transmitting vehicle (2).

10. The method according to claim 8, characterized by establishing, before establishing (S1) the presence of the further vehicle (3), that there is no vehicle between the transmitting vehicle (2) and the subject vehicle (1).

11. The method according to claim 8, characterized in that said control (S2) of the subject vehicle (1) in dependence on the received wireless signals comprises, before establishing (S1) the presence of the further vehicle (3), controlling the subject vehicle (1) so as to be at a first distance (DST1) from the transmitting vehicle (2).

12. The method according to claim 11, characterized in that the control (S6) of the subject vehicle (1) in dependence on the received wireless signals comprises, after establishing (S1) the presence of the further vehicle (3), controlling the subject vehicle (1) so as to be at a second distance (DST2) from the transmitting vehicle (2) which is larger than the first distance (DST1).

13. The method according to claim 8, characterized by determining, upon establishing (S1) the presence of the further vehicle (3), by the means (111) other than means for wireless communication, the distance (DSF) between the subject vehicle (1) and the further vehicle (3).

14. The method according to claim 13, characterized by controlling (S5), if the determined distance (DSF) is below the threshold distance value, the velocity and/or acceleration of the subject vehicle (1) so as to increase the distance between the subject vehicle and the further vehicle (3).

15. The method according to claim 1, characterized in that the monitoring of the distance (DSF) between the subject vehicle (1) and the further vehicle (3) comprises continuously or repeatedly determining a velocity of the further vehicle (3) in relation to the subject vehicle (1).

16. The method according to claim 15, characterized by comparing the determined further vehicle velocity to a threshold velocity value, wherein determining whether or not to control (S5) the velocity and/or acceleration of the subject vehicle (1) in dependence on the monitored distance (DSF) comprises, if the determined velocity of the further vehicle (3) in relation to the subject vehicle (1) is below the threshold velocity value, the velocity and/or acceleration of the subject vehicle (1) is controlled (S5) in dependence on the monitored distance (DSF).

17. The method according to claim 1, characterized in that the monitoring of the distance (DSF) between the subject vehicle (1) and the further vehicle (3) comprises continuously or repeatedly determining an acceleration of the further vehicle (3) in relation to the subject vehicle (1).

18. The method according to claim 17, characterized by comparing the determined further vehicle acceleration to a threshold acceleration value, wherein determining whether or not to control (S5) the velocity and/or acceleration of the subject vehicle (1) in dependence on the monitored distance (DSF) comprises, if the determined acceleration of the further vehicle (3) in relation to the subject vehicle (1) is below the threshold acceleration value, the velocity and/or acceleration of the subject vehicle (1) is controlled (S5) in dependence on the monitored distance (DSF).

19. A non-transitory computer readable medium carrying a computer program comprising program code for performing the steps of claim 1 when said program product is run on a computer.

20. A control unit including a processor configured to perform the steps of the method according to claim 1.

21. A vehicle comprising a control unit according to claim 20.

\* \* \* \* \*